United States Patent Office 3,561,078
Patented Feb. 9, 1971

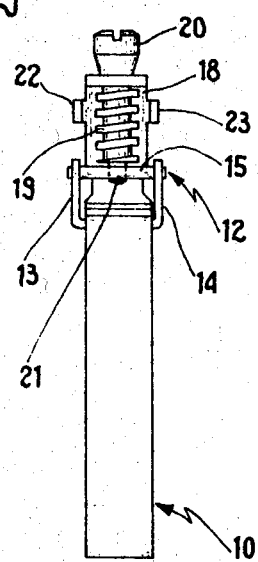
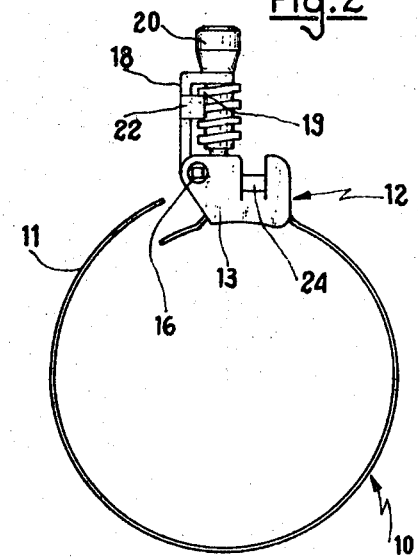
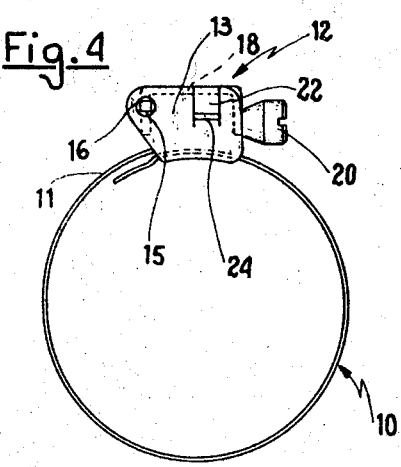
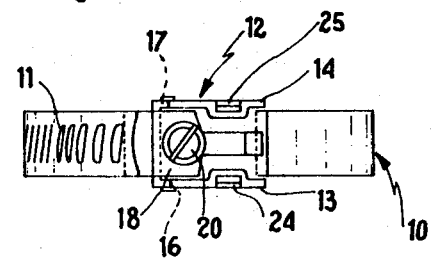
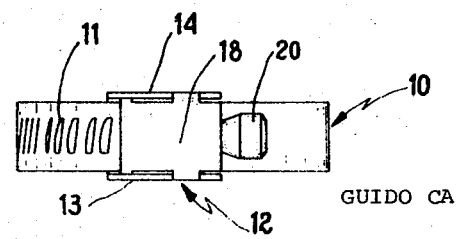

3,561,078
BAND CLIPS
Guido Care, 10a Via Dossello, Villanuova sul Clisi,
Brescia, Italy
Filed Dec. 5, 1968, Ser. No. 781,521
Claims priority, application Italy, Jan. 17, 1968,
11,661/68
Int. Cl. B65d 63/00
U.S. Cl. 24—274      3 Claims

ABSTRACT OF THE DISCLOSURE

A band clip adapted for securing a hose pipe or the like on to a tubular connection, of the type comprising a band having a suitably slotted end section and an opposite section carrying a stationary support, to which a worm screw bearing element is pivotally secured. Said bearing element which can be brought in an operative position wherein the worm screw gets engaged with said slotted section, carries a pair of sidewardly extending ears, adapted to cooperate with said stationary support in order to transfer to the latter the torque stress as caused by the tightening operation of said worm screw.

---

This invention relates to band or hose clips for flexible tubes or pipes, which are particularly designed for firmly clamping such tubes on to tubular rigid elements.

In particular this invention concerns a band or hose clip, usually made of a metallic material, which comprises a band having a suitably slotted end section and an opposite end section carrying a stationary support to which tilting bearing means for a worm screw or the like are pivoted, said worm being designed to engage with said slotted section. A band clip of the above-stated type allows to perform a quick assembly, since it is possible to initially clamp the band around the pipe, while keeping said worm bearing means in their upwardly tilted position, whereafter said bearing means are tilted downward and the clip can be tightly clamped around the pipe by the operation of said worm screw. However, such arrangement involves an unusually high stress of the pin on which said bearing means are tilted, which is the sole component connecting said bearing means with their support. Such stress, that is caused by the screwing force as applied to the worm during the clamping operation, may result in some cases in a distortion of said pin, which can be also drawn out of their seats, whereby the reliability of the device is heavily prejudiced in the former case, or the band clip is made wholly useless in the latter case.

An object of the invention is to prevent the above-stated drawbacks, by partly or wholly diverting from said pin the excessive stress which is loading the same in the already known devices.

A further object is to provide means by which a torque, as generated by the tightening operation of the worm screw, is transmitted from the worm screw bearing means to a stationary support to which the bearing means are pivotally connected, whereby all components of the stationary support cooperate to take up the torque stress.

A further object is to provide torque transmitting means consisting of one or more ears extending from the worm screw bearing means to engage with corresponding front and side zones of the plates by which the stationary support is made up with the ears acting in a direction substantially parallel to the tilting axis of the bearing means from which they extend.

With the above and other objects in view which will become apparent from the following detailed description of a preferred embodiment and shown in the accompanying drawing, in which:

FIGS. 1, 2 and 3 respectively show a front view, a side view and a plan view of a band clip according to the invention, in the upwardly tilted position of the related worm screw bearing means.

FIGS. 4 and 5 respectively show a side view and a plan view of the same band clip, in which the worm screw bearing means are in their operative position.

Referring to the drawings, the embodiment of a band clip as shown therein consists of an annular metal band 10, having a suitably slotted end portion 11 and carrying at its opposite end a device 12 adapted to engage and tighten said slotted end portion 11. Said device 12 consists of a stationary support comprising two side plates 13 and 14, firmly secured to the band end and connected with each other by a pin 15 that extends through suitable holes 16 and 17, formed on said side plates. Fastened to said pin 15 is a bearing element 18, which is U-shaped and can be tilted around the axis of said pin 15. Said bearing element 18 carries in turn a worm screw 19, having an outer slotted head 20 by which it can be turned. The worm screw engages with the slots of said band end portion 11 when the bearing element 18 is tilted downwards, as shown in FIGS. 4 and 5.

To prevent that the tightening torque exerted on the worm screw 19 is transmitted to said pin 15 only through the worm screw end 21, which is rotatably seated in the bearing element 18, thus causing a distortion of said pin or sliding of its ends out of the openings 16 and 17 of the side plates 13 and 14, supporting ears 22 and 23 are provided, according to the invention on both sides of the U-shaped bearing element 18. By said side ears 22 and 23, which could be substituted by equivalent means, said torque is evenly transmitted to both plates 13 and 14, in a point thereof which is relatively far from the tilting pin 15, thereby distributing the stress on either plates and thus simultaneously relieving said pin 15. To make the bringing of said ears into their engaging or operative positions easier and to increase the contact surface area with the side plates 13 and 14, suitable seats 24 and 25 wherein said ears 22 and 23 get engaged in the operating position of the worm screw 19 (see FIGS. 4 and 5) are formed, e.g., by a deep-drawing operation on said plates. In such a manner and according to the invention, the bearing element 18 of the worm screw 19 and said ears 22 and 23 will form, in the operative position of said bearing element, a mechanical assembly, which components are rigidly connected with one another and undergo to substantially similar deformations, while remaining always in the same mutual position. Thus, on one hand the tightening stresses are discharged onto the base of said support 13 and 14, i.e., in a section having a strength sufficient to take them up without any noticeable damage or deformation, while on the other hand a relative displacement cannot be suffered by the components of the device 12 and in particular the plates 13 and 14 cannot be drawn away from each other, which would result in a distortion of the pin 15 or in a sliding thereof from its seats.

While the invention has been described with some detail, it is to be understood that the description is given for the purpose of illustration only, and is not definitive of the limits of the inventive idea. The right is reserved to make such changes in the details of construction and arrangement of parts, as will fall within the purview of the attached claims.

I claim:

1. A band clip for clamping flexible tubes or hoses comprising a band having a slotted end section and an opposite end section, stationary support means on said opposite end section, tilting bearing means comprising an upturned U-shaped member with one edge pivotally connected to said support means, means provided on said bearing means for engaging said slotted end section, transmitting means on said bearing means whereby a torque stress is transmitted from said bearing means to said stationary support means, said support means comprising a pair of plates, a pin extending between said plates upon which said bearing means are pivoted, said transmitting means comprising an ear located on each side of said bearing means extending from said bearing means and engaging with the corresponding outer side surface of said plates and acting on points of said support means far from said pin in a direction substantially parallel thereto cooperating with said pin which represents the axis in the transmission of said torque stress, said ears extending sidewise and downwardly from both sides of said U-shaped member base.

2. A band clip as set forth in claim 1 wherein said means for engaging said slotted end section is a worm screw.

3. A band clip as set forth in claim 1 wherein recesses are provided on said plates and said ears cooperate with said recesses.

References Cited

UNITED STATES PATENTS 3,189,968   6/1965   Henning _____ 24—274P

FOREIGN PATENTS 1,484,749   5/1967   France _____ 24—274P

DONALD A. GRIFFIN, Primary Examiner